Oct. 26, 1971    A. MULLER    3,614,971
CONNECTING LINK FOR TIRE CHAINS
Filed May 16, 1969    2 Sheets-Sheet 1
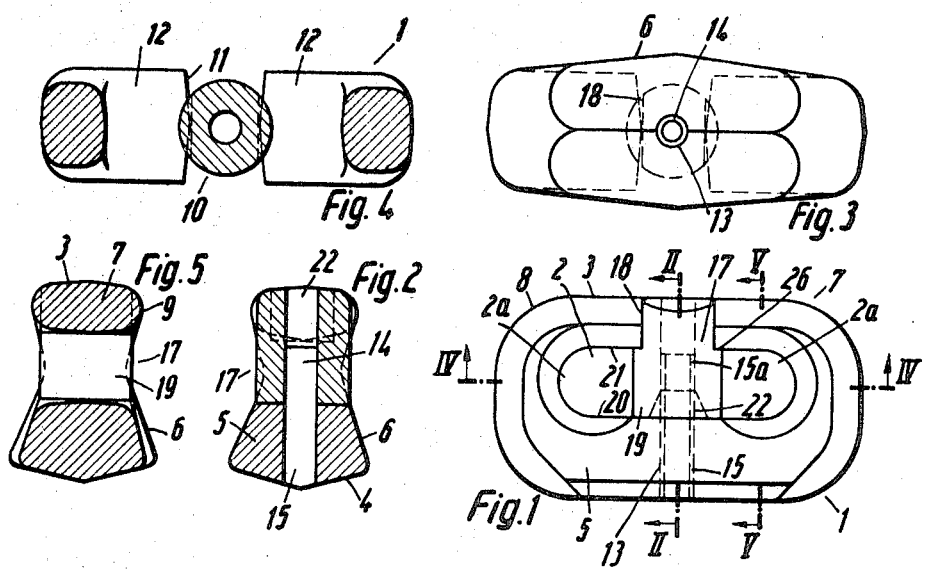
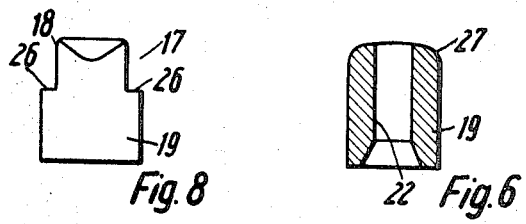
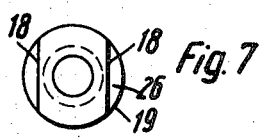
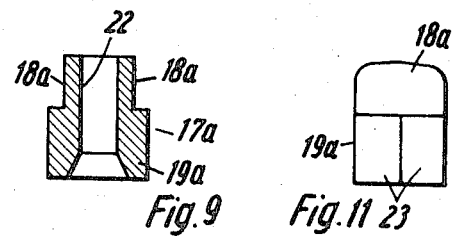
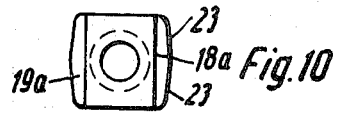
Inventor:
Anton Müller
By Oct. 26, 1971  A. MULLER  3,614,971
CONNECTING LINK FOR TIRE CHAINS
Filed May 16, 1969  2 Sheets-Sheet 2
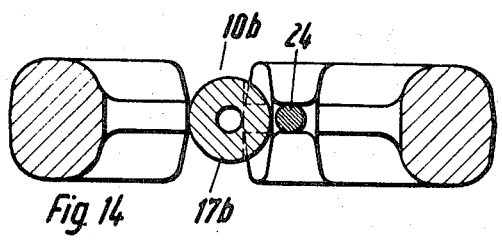
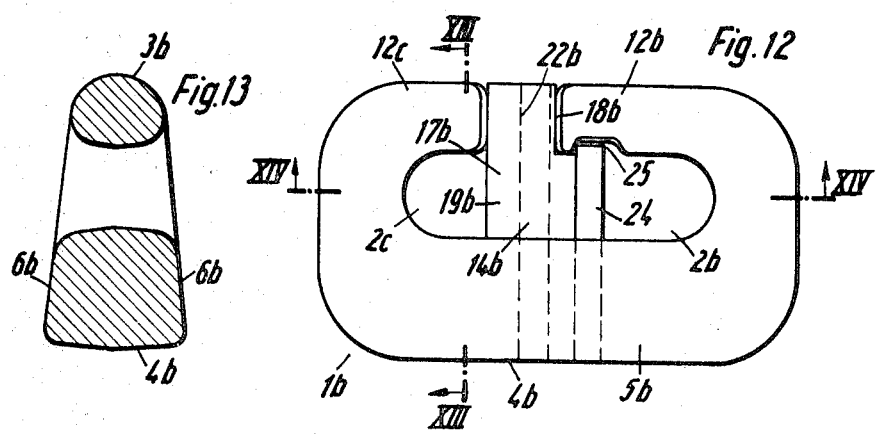
Inventor:
Anton Müller 3,614,971
CONNECTING LINK FOR TIRE CHAINS
Anton Muller, Unterkochen, Germany, assignor to Eisen- und Drahtwerk Erlau AG, Aalen, Wurttemberg, Germany
Filed May 16, 1969, Ser. No. 825,277
Claims priority, application Germany, May 18, 1968,
P 17 55 529.2
Int. Cl. B60c 27/00
U.S. Cl. 152—243                25 Claims

ABSTRACT OF THE DISCLOSURE

Connecting link for use in tire chains for connecting chain links together and consisting of a web-like body having an elongated aperature therein and a slot in one of the longer edges opening into the aperture and a closure member extending across the aperture and into the slot for confining chain links to the respective ends of the slot. A pin extending through a bore in the body and in the closure member detachably connects the closure member to the body.

---

The invention concerns a connecting link for tire chains with openings for receiving adjacent chain links, at least one of said openings being provided with an outwardly leading suspension opening while a detachable closing member is provided for closing the suspension opening.

In tire protection chains, as a rule a plurality of double hooks or connecting hooks is employed, which hooks establish the connection at the individual abutment areas, primarily of the main or running portion of the chain to the lateral portion and from the lateral portion to the lateral chain. Such connecting members are also employed as replacement parts or repair members which are used at damaged areas of the tire chain or may be exchanged for damaged chain links.

It is an object of the present invention so to design a connecting link of the above mentioned general type that it will be simple in construction and will be superior to heretofore known chain links primarily by a considerably greater strength and resistance against breakage and wear.

These and other objects and advantages of the invention will appear more clearly from the following specification in connection with the accompanying drawings, in which:

FIG. 1 illustrates in side view a connecting link according to the present invention.

FIG. 2 represents a section taken along the line II—II of FIG. 1.

FIG. 3 shows the connecting link of FIG. 1 as seen from the bottom.

FIG. 4 is a section taken along the line IV—IV of FIG. 1.

FIG. 5 represents a section taken along the line V—V of FIG. 1.

FIG. 6 is a cross section through the closure member according to the invention and shown in FIG. 1.

FIG. 7 is a top view of the closure member of FIG. 6.

FIG. 8 is a side view of the closure member of FIG. 6.

FIGS. 9 to 11 respectively illustrate a vertical section, a top view, and an end view of a closure member according to the invention.

FIG. 12 shows a side view of a modified connecting link according to the invention.

FIG. 13 is a section along the line XIII—XIII of FIG. 12.

FIG. 14 is a section taken along the line XIV—XIV of FIG. 12.

The closure member according to the invention for tire chains with openings for receiving adjacent chain links while of said openings at least one is provided with an outwardly leading suspension opening and for closing the suspension opening there is provided a detachable closure member, is characterized primarily in that the closure member has at least one supporting surface for resting against a surface delimiting the suspension opening. In this way, the freely protruding legs of the link which delimit the suspension opening can be safely supported so that the connecting link will have a high break resistance.

Referring now to the drawings in detail, FIGS. 1 to 5 show a connecting link according to the invention in the form of a web link of high strength which is provided with a longitudinal receiving opening 2 for chain links to be suspended therein. The receiving opening 2 is eccentrically located with regard to the vertical height of the connecting link 1. The web portion 5 of the connecting link 1 has a running surface 4 which in cross section is roof-shaped. The cross section of the said web member 5 is substantialy trapezoidal in transverse section in such a way that its lateral surfaces 6 toward the receiving opening 2 and tire engaging surfaces 3 up to the center of the height of the receiving opening 2 extent at an acute angle with regard to each other. Due to the fact that the receiving opening 2 is eccentric in the connecting link 1, the web member 5, which has the running surface 4, has a greater wear resistance height than the web member 7 which comprises the tire engaging surface and the lateral surfaces of which are likewise inclined at an actuate angle toward the center of the height of the receiving opening 2. The lateral surfaces are inclined toward the center of the height of the opening 2 in such a way that the connecting link 1 has a cross section which according to FIGS. 2 and 5, is substantially double trapezoidal and at low weight has a considerably high resistance. The lateral surfaces 6 of the web member 5, in conformity with FIG. 3 of the drawings are spaced widest from each other at the central portion of the length of the link 1. The lateral surfaces 16 extend from this center at an acute angle toward both link ends. The web member 7 on the other hand which comprises the tire engaging surface 3 has over its entire length substantially the same width while, however, the lateral surfaces 9 of this web member 7 are circularly arranged in such way that the web member 7 in cross section will be approximately elliptical or longitudinally round. The corner areas 8 of the substantially rectangular connecting link 1 are considerably rounded off with the radius of rounding approximately one-fourth of a circle.

As will furthermore be seen from FIG. 4, symmetrically to the central portion of the length of the web member 7 comprising the tire engaging surface 3, there is provided a suspension opening 10 which is formed by an interruption of the web member 7 or by a two-sectional design of the web member 7. The end faces 11 facing each other and pertaining to the two web legs 12 which extend freely toward each other are respectively formed by two individual surfaces which define with each other an obtuse angle. Said individual surfaces intersecting each other in the longitudinal central plane of the link 1 and there protruding to the greatest extent while the end faces 11 are located approximately perpendicular to the running surface of the link 1. In the center of the length of the web member 5 of link 1 which comprises the running surface 4, there is provided perpendicularly with regard to the running plane a bore 13 in which a bolt 14 with press fit is displaceably guided over a relatively large length. The longitudinal axis of bolt 14 or bore 13 extends symmetrically through the center of the suspension opening 10 while this suspension opening 10 exceeds the diameter of the bolt 14. The bolt 14 is subject to wear only to the same extent as the web member 5.

Connected to the front end 115a of the bolt 14, which end is located in the link opening 2, is a closure member 17 by which the link opening 2 is sub-divided into two individual receiving openings 2a separated from each other. The closure member 17 is formed primarily by a cylindrical part which can easily be produced and which has plane parallel flat portions located at one end of said cylindrical part and arranged opposite to each other. These two plane parallel flat parts are spaced from each other in conformity with the minimum distance between the web legs 12 or end faces 11, in other words, corresponds to the minimum width of the suspension opening 10. The height of the section provided with the flattened portions 18 is slightly less than the height of the web legs 12, whereas the height of the remaining cylindrical section 19 of the closure member 17 corresponds to the height of the link opening 2. As a result thereof, the closure member 17 can be introduced into the receiving opening 2 or suspension opening 10 in a direction transverse to the longitudinal central plane of the connecting link 1 in such a way that one of its end faces and its shoulders 26 rest against the oppositely located inner surfaces 20, 21 of the member 1, and the strength of the member 1 particularly parallel to the direction in which it is primarily subjected to load, is substantially increased. Along the central axis of the closure member 17 there is provided a bore 22 in which is mounted bolt 14, preferably with press fit. As indicated in FIGS. 2 and 5, the diameter of the cylindrical section 19 of the closure member 17 is slightly greater than the smallest width of the member 1 so that the cylindrical section 19 will laterally slightly protrude beyond the lateral surfaces 6 of the link. The diameter of the cylindrical section 19, however, is so selected that it approximately equals the smallest width of the web member 5. According to the embodiment of FIGS. 1–5 which shows a particularly simple construction, the bolt is formed by a spiral pin 14 which over its entire length is located in the web portion 5 and the closure member 17 and is thus completely covered up. In the starting position, i.e. prior to the assembly of the connecting link according to the invention, the rear end 15 of bolt 14 protrudes beyond the running surface 4 in such a way that the front end 15a of the bolt 14 is located in the bore 13 of the web member 5. After chain links to be interconnected have been introduced through the suspension opening 10 into the receiving opening 2 of the conecting link 1, the closure member 17 is transverse to the longitudinal central plane of member 1 introduced into the receiving opening 2 and the suspension opening 10 whereupon the bolt 14 is by means of a hammer hitting the rear end 15 driven into the bore 22 of the closure member 17 which bore is co-axial to said bolt 14, so that two individual receiving openings 2a are formed which are separate from each other and from which the inserted chain links (not shown) can no longer detach themselves because the suspension opening 10 is closed by the closure member 19. In this position of use, the rear end 15 of bolt 14 is flush with the running surface 4 of the connecting link 1. For purposes of removing the bolt 14 from its position of use, the bolt 14 is knocked through the bore 13 and the suspension opening 10 or in opposite direction so that the connection established by bolt 14 between the closure member 17 and connecting member 1 is disengaged in a simple manner and the closure member 17 can again be removed. This may be effected by the selected bolt length also when the chain is mounted on a tire. The disengaged bolt 14 can then be employed again.

Inasmuch as the bolt 14 is located within the lateral surfaces of the web-shaped connecting link 1 and since the closure member does not protrude laterally or only to a negligible extent, damage to the bolt 14 and the closure member will be practically impossible when employing the connecting link.

The closure member 17 may be clamped in between the web legs 12 or within the range thereof may have a width which approximately equals the distance between the end faces 11 so that the web leg 12 will also be effectively supported when the closure member 17 lacks the section 19 engaging the surfaces 20, 21. The web legs 12 will when being subjected to a load carry out pivotal movements while springing in a plane perpendicular to the running surface of link 1, so that the distance between the end faces 11 becomes less and the web legs 12 by means of their end faces 11 will rest against the corresponding surfaces 18 of the insert member 19. Due to the fact that the section 19 of the closure member 17, which section is located in the receiving opening 2 and separates the individual openings 2a from each other, is cylindrical, the delimiting surfaces of the individual openings 2a, which surfaces are formed by the section 19, are crowned as in the case with the remaining delimiting surfaces of the individual openings 2a by corresponding rounded areas so that an easy movability of the suspended chain link will be assured. The clamping member of the connecting link according to FIGS. 1–5 is illustrated on an enlarged scale in FIGS. 6–8. As will be evident from FIG. 6, the end faces 27 of that portion of the closure member 17 which are located in the suspension opening 10 are rounded preferably so that the rounding forms a one-fourth of a circle. The closure member may also be designed in accordance with FIGS. 9–11. The closure member 17a shown in FIGS. 9–11 has a substantially rectangular plane view while two oppositely located parallel surfaces 18a are provided on the narrower section which is to be arranged in the suspension opening 10a. The wider section 19a of the closure member 17, which section separates the individual openings 2a from each other, has its sides thereof which are approximately parallel to the flattened portion 18a provided with individual surfaces 23 which are inclined toward each other at such an obtuse angle that the lateral surfaces formed by these individual surfaces 23 are convexly curved similar to the embodiment of FIGS. 6–8 whereby an easy movability of the chain links to be suspended in the receiving opening 2a will be assured.

With the double hook link 1b according to FIGS. 12–14, likewise two individual suspension openings 2b, 2c are provided which are separated from each other by a closure member 19b, said openings being of different sizes. The closure member 17b is formed by a substantially cylindrical part which has that section thereof that is located in the suspension opening 10b provided on one side thereof with an axis-parallel flat portion 18b by means of which it engages the longer web leg 12b of the double hook link. That cylindrical side of the closure member 17b which faces away from the flattened portion 18b engages the corresponding surfaces of the other web leg 12c which delimits the suspension opening 10b one one side.

The closure member 17b is held by a pin 14b introduced into its longitudinal bore 22b. Pin 14b is held in a plane perpendicular to the running plane of the link 1b determined by the running plane 4b, in the web leg 5b which comprises the running surface 4b.

Toward the larger receiving opening 2b and, more specifically, in the web part 5b there is provided a safety pin 24 which is parallel to the bolt or pin 14b. Pin 24 extends into the opening of the link and its free end is located in a recess 25 on the inside of the longer web leg 12b. That portion of the safety pin 24 which is located in the link opening engages at least approximately the circumference of the wider section 19b of the closure member 17b so that considerable forces can be absorbed.

The connecting link illustrated in FIGS. 12 to 14 has, when viewed in cross section according to FIG. 13, lateral surfaces 6b which toward the curved tire engaging surface 3b taper toward each other at an acute angle so that the connecting link has its largest width at the running surface 4b while the width of the connecting link 1 is approximately uniform over the entire length thereof.

It is, of course, to be understood that the present invention is, by no means, limited to the particular constructions shown in the drawings but also comprises any modifications within the scope of the appended claims.

What is claimed is:

1. A connecting link for joining adjacent chain links of a tire chain and comprising: a web-like body having parallel tire engaging and diverging surfaces extending lengthwise of said body, said body having ends transverse to the length of said body, aperture means formed in said body, a lateral slot extending from one of said surfaces of said body into said aperture means to permit the chain links to be introduced into said aperture means, a closure member closing said slot and confining chain links in said aperture means on respective sides of said closure member, said closure member engaging the wall of said aperture means on the side opposite side slot and also engaging the wall of said aperture means adjacent said slot and including a widened shoulder portion disposed in said slot, and retaining means detachably connecting said closure member to said body.

2. A connecting link according to claim 1, in which said retaining means is in the form of a rod-like element extending into said body through the edge opposite said one edge and extending across said aperture means, said closure member having a bore therein receiving said element journalled as movable longitudinally thereof.

3. A connecting link according to claim 2, in which said element is a pin having a press fit in at least one of the bores provided therefor in said body and said bore in said closure member.

4. A connecting link according to claim 1, in which said closure member engages the wall of said aperture means on both longitudinal sides of said slot.

5. A connecting link according to claim 4, in which said closure member has a first portion disposed in said slot and a second portion integral with said first portion and disposed in said aperture means between opposite walls thereof.

6. A connecting link according to claim 5, in which the lateral surfaces of said second portion of the closure member toward the ends of said aperture means are convex.

7. A connecting link according to claim 5, in which said second portion of said closure member is circular in cross section.

8. A connecting link according to claim 5, in which both said portions of said closure member are substantially quadrangular in cross section and the said second portion has those sides facing the respective ends of said aperture means formed by a pair of surfaces which define an angle therebetween on the side facing the respective end of said aperture means which is greater than 180°.

9. A connecting link according to claim 7, in which said first portion of said closure member is round in cross section with diametrally opposite flats facing the opposite sides of said slot.

10. A connecting link according to claim 9, in which said flats are spaced apart substantially the same distance as said opposite sides of said slot.

11. A connecting link according to claim 3, which includes a safety pin mounted in a bore provided therefor in said body in one of said edges thereof, said pin being disposed adjacent said closure member on a side thereof facing one end of said aperture means.

12. A connecting link according to claim 11, in which said safety pin engages the adjacent side of said closure member.

13. A connecting link according to claim 12, in which the wall of said aperture means opposite the bore for the safety pin has a recess into which the end of the safety pin extends.

14. A connecting link according to claim 1, in which the maximum lateral dimension of said closure member is no greater than the minimum lateral dimension of said body.

15. A connecting link according to claim 2, in which said element has its length extending in a direction substantially parallel to the longitudinal central plane of said body.

16. A connecting link according to claim 15, in which the length of said element extends in a direction substantially perpendicular to said edges of said body.

17. A connecting link according to claim 2, in which said aperture means and slot form hooks, the open ends of which are closed by said closure member.

18. A connecting link according to claim 17, in which said aperture means is elongated and has rounded ends and parallel sides, said sides being parallel with said edges of said body.

19. A connecting link according to claim 18, in which said slot is centrally located with respect to the length of said aperture means and is in the tire engaging edge of said body.

20. A connecting link according to claim 19, in which the bore in said body for said element is in the central plane of said slot in the running edge of said body.

21. A connecting link according to claim 20, in which said bore is in the center of said running edge.

22. A connecting link according to claim 21, in which said element is disposed completely within the confines of said body and closure member.

23. A connecting link according to claim 22, in which the portion of said body between said running edge and the adjacent side of said slot is substantially trapezoidal in cross section.

24. A connecting link according to claim 23, in which said portion of said body has the form of two trapezoids with their bases in abutting relation.

25. A connecting link according to claim 18, in which the longitudinal central axis of said aperture means is closer to the tire engaging edge of said body than it is to the said running edge thereof.

References Cited

UNITED STATES PATENTS 3,416,587   12/1968   Schurle et al.   152—244

FOREIGN PATENTS 71,770   11/1948   Norway   152—243

JAMES B. MARBERT, Primary Examiner